United States Patent [19]

Miki et al.

[11] Patent Number: 4,574,910
[45] Date of Patent: Mar. 11, 1986

[54] TRANSMISSION FOR AGRICULTURAL TRACTORS

[75] Inventors: Hiroyuki Miki, Sakai; Mikio Kinoshita, Izumisano; Tetsu Fukui, Sakai, all of Japan

[73] Assignee: Kubota, Ltd., Osaka, Japan

[21] Appl. No.: 680,868

[22] Filed: Dec. 12, 1984

[30] Foreign Application Priority Data

Dec. 16, 1983 [JP] Japan .................. 58-194794[U]

[51] Int. Cl.⁴ ............................................. B60K 17/34
[52] U.S. Cl. ................................. 180/249; 180/75.1; 180/900
[58] Field of Search ............. 180/233, 248, 249, 75.1, 180/900

[56] References Cited

U.S. PATENT DOCUMENTS 3,941,199  3/1976  Williams .......................... 180/249
4,326,597  4/1982  Murayama et al. ............... 180/75.1

Primary Examiner—John A. Pekar
Assistant Examiner—Donn McGiehan
Attorney, Agent, or Firm—Edwin E. Greigg

[57] ABSTRACT

A transmission for agricultural tractors in which a front wheel speed increasing transmission part (12) is disposed forwardly of a main transmission part (8). An input shaft (13) and an output shaft (15) of the speed increasing transmission part (12) are arranged coaxial with a front wheel drive output shaft (14a) of the main transmission part (8).

2 Claims, 7 Drawing Figures

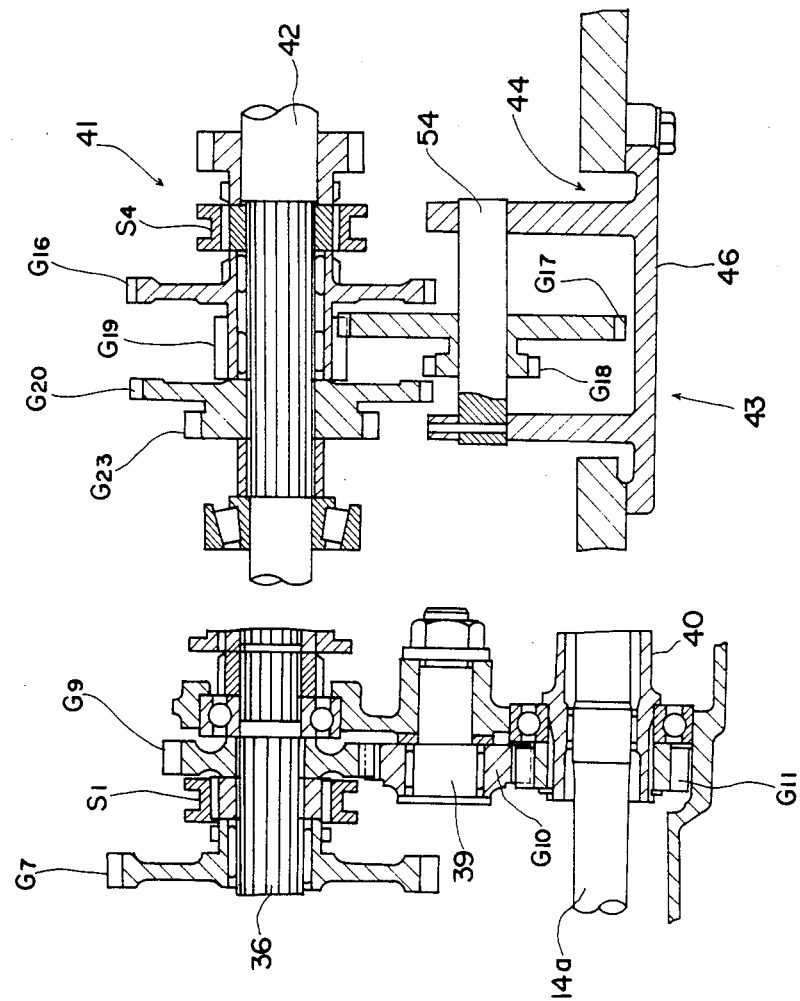

TRANSMISSION FOR AGRICULTURAL TRACTORS

BACKGROUND OF THE INVENTION

This invention relates to a transmission for propelling agricultural tractors in which a main transmission has, directly connected thereto, a speed increasing transmission part adapted to drive a right and left pair of dirigible front wheels at a greater average circumferential speed than a right and left pair of rear wheels.

An agricultural tractor of the type noted above has the front wheels adapted to be driven at increased speeds in order to make a small sharp turn at an end of the field. Conventionally, the speed increasing transmission part is directly connected to a bottom portion of the main transmission in order that the addition of the speed increasing transmission part may easily be effected without necessitating an extensive modification of the main transmission. This arrangement has a disadvantage that the attached speed increasing transmission part projects downwardly from the main transmission lowering the bottom of a transmission case relative to the ground. As a result, the transmission case tends to contact ridges and crops when the tractor carries out an operation while stradding the ridges.

SUMMARY OF THE INVENTION

An object of this invention is to provide an improved construction which permits the speed increasing transmission part to be attached to the main transmission with ease and the bottom of the transmission case to be at a good height from the ground.

In order to achieve the above object, a transmission for agricultural tractors according to this invention comprises a main transmission part, and a speed increasing transmission part directly connected to the main transmission part and adapted to drive a right and left pair of dirigible front wheels at a greater average circumferetial speed than a right and left pair of rear wheels, the main transmission part including an output shaft for driving the front wheels, and the speed increasing transmission part including an input shaft and an output shaft, wherein the speed increasing transmission part is disposed forwardly of the main transmission part such that the input shaft and the output shaft thereof are arranged coaxial with the output shaft of the main transmission part for driving the front wheels.

The speed increasing transmission part has an intermediate shaft in addition to the input shaft and the output shaft, and this intermediate is disposed above the other two shafts. The speed increasing transmission part having such a construction is disposed forwardly of the main transmission part as noted above. More particularly, the speed increasing transmission part is coupled to a forward end of the output shaft of the main transmission part. This arrangement permits the addition of the speed increasing transmission part to be effected with ease and without necessitating an extensive modification of the main transmission part. Because of the described construction of the speed increasing transmission part which is disposed forwardly of the main transmission part, the speed increasing transmission part does not project downwardly from the main transmission part, whereby the bottom of a transmission case may be at a good height from the ground. A tractor equipped with the above transmission arrangement is capable of making a small sharp turn and engaging in work with the transmission case hardly coming into contact with ridges or crops.

Other objects and advantages of this invention will be apparent from the following description.

BRIEF DESCRIPTION OF THE DRAWINGS

The drawings illustrates a transmission for agricultural tractors embodying this invention, in which:

FIG. 4 is a developed side view of a backing mechanism, FIG. 5 is a plan view of an auxiliary change speed mechanism and a super-reduction mechanism.

DESCRIPTION OF THE PREFERRED EMBODIMENT

Figure 1:
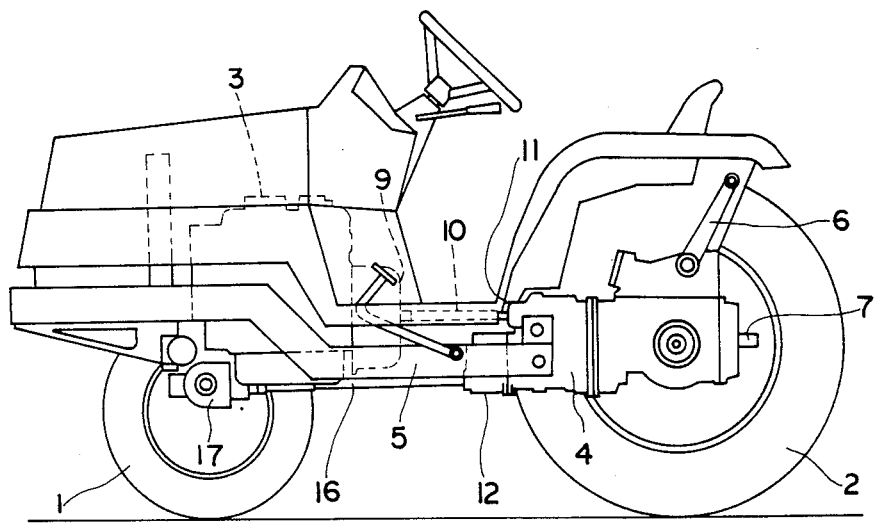
FIG. 1 is a partly broken away side view of an agricultural tractor.

As shown in FIG. 1, a front wheel drive agricultural tractor comprises a right and left pair of dirigible front wheels 1, a right and left pair of nondirigible rear wheels 2, an engine 3, a transmission case 4, and a right and left pair of frames 5 interconnecting the engine 3 and the transmission case 4. The tractor includes a vertically oscillatable lift arm 6 for attaching a rotary plow or various other working implements, and a power takeoff shaft 7 for driving the attached working implement.

Figure 2:
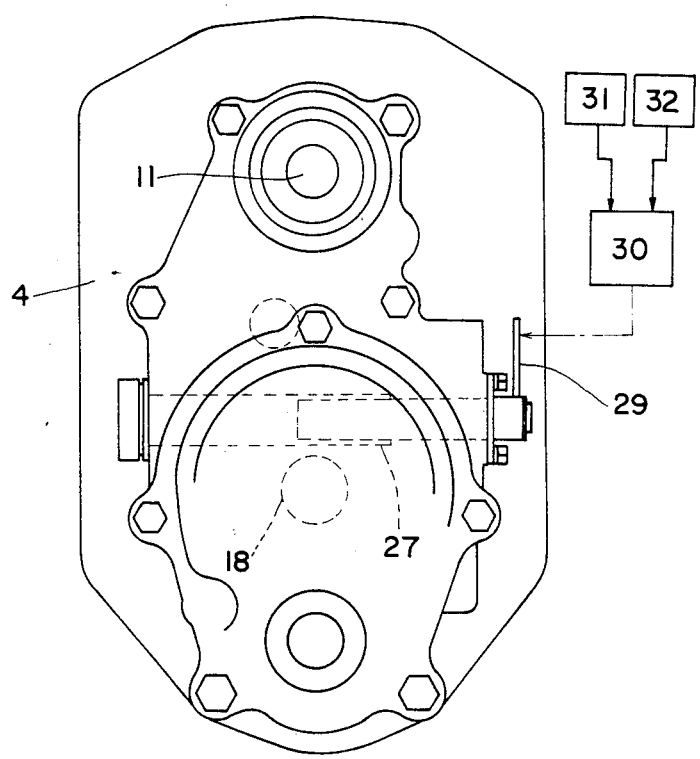
FIG. 2 is a front view of a transmission case.
Figure 3:
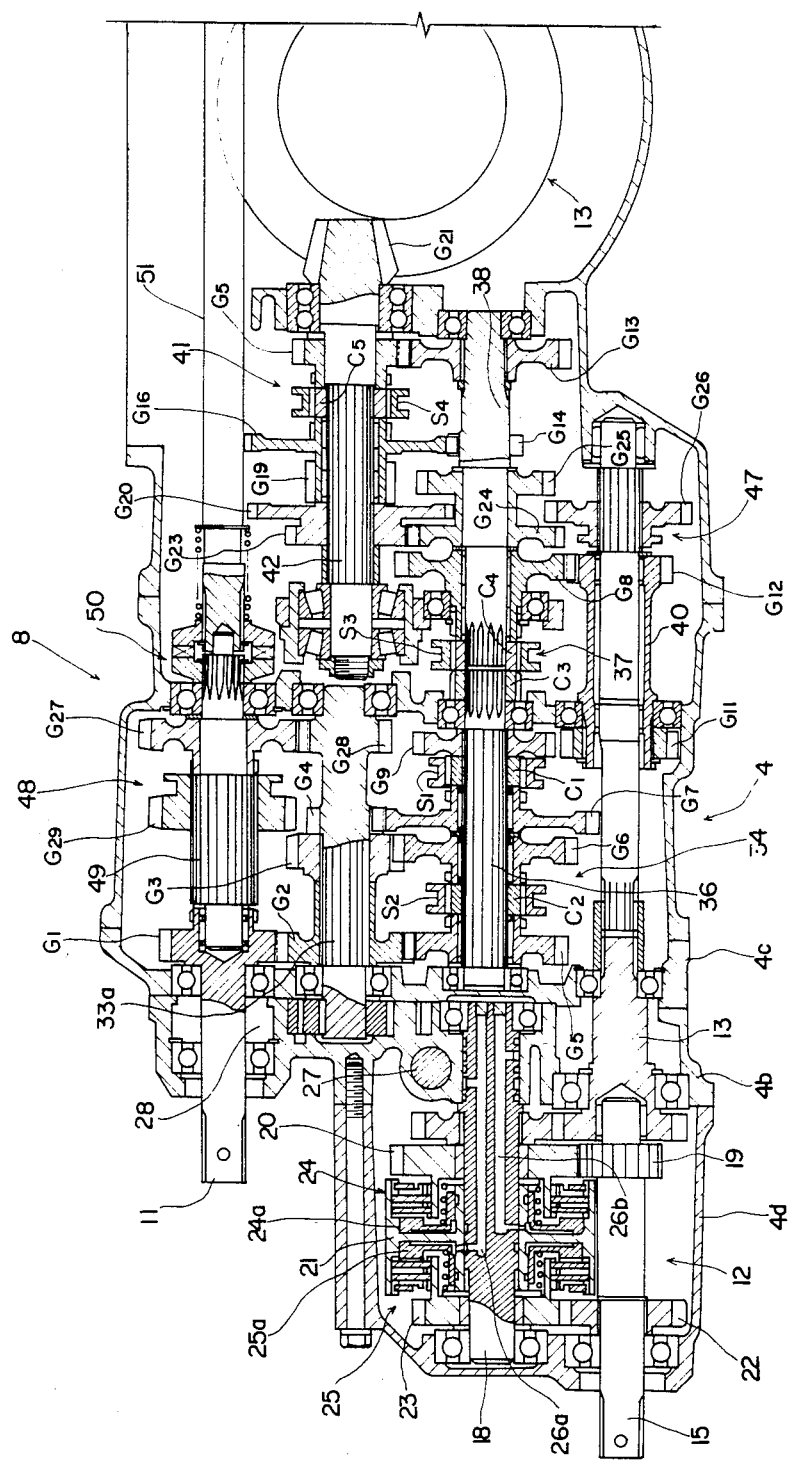
FIG. 3 is a side view in vertical section of a transmission including a front wheel speed increasing transmission part.

Referring to FIGS. 1 through 3, the transmission case 4 houses a main transmission part 8 adapted to effect speed changing for the front wheels 1 and the rear wheels 2. The main transmission part 8 includes an input shaft 11 to which an output of the engine 3 is transmitted through a clutch 9 and a rotary shaft 10. The transmission case 4 further houses a speed increasing transmission part 12 disposed forwardly of the main transmission part 8, the speed increasing transmission part 12 including an input shaft 13 coaxial with and directly coupled to a front wheel driving output shaft 14a of the main transmission part 8. The speed increasing transmission part 12 further includes an output shaft 15 also coaxial with the output shaft 14a of the main transmission part 8 and operatively connected to a front differential 17 through a rotary shaft 16. The output of the engine 3 is divided in the main transmission part 8 into power for driving the front wheels 1 and power for driving the rear wheels 2. The power for driving the front wheels is transmitted through the speed increasing transmission part 12 to the front wheels 1, while the power for driving the rear wheels is transmitted through a rear wheels differential 13 mounted in the transmission case 4 to the rear wheels 2.

The speed increasing transmission part 12 includes an intermediate shaft 18 disposed above the input shaft 13 and the output shaft 15 and constantly driven by the input shaft 13 through a gear interlocking. The intermediate shaft 18 carries a first freely rotatable drive gear 20 in mesh with a first driven gear 19 mounted on the output shaft 15, a second freely rotatable drive gear 23 in mesh with a second driven gear 22 mounted on the output shaft 15, and an output wheel 21 rotatable in unison with the intermediate shaft 18. A unison speed hydraulic clutch 24 is mounted between the first freely rotating drive gear 20 and the output wheel 21, while a speed increasing hydraulic clutch 25 is mounted between the second freely rotatable drive gear 23 and the output wheel 21. Oil chambers for pistons 24a and 25a associated with these clutches 24 and 25, respectively, are connected to a hydraulic pump 28 through oil passages 26a and 26b defined in the intermediate shaft 18 and a control valve 27 adapted to operate the clutches 24 and 25 selectively. When the speed increasing clutch 25 is brought into operation by switching the control valve 27, an output of the main transmission part 8 is transmitted to the output shaft 15 in an increased speed whereby the front wheels 1 are driven at a greater average circumferential speed than the rear wheels 2. When the uniform speed clutch 24 is brought into operation, the output of the main transmission part 8 is transmitted to the output shaft 15 in the same speed whereby the front wheels 1 are driven at an average circumferential speed only slightly exceeding that of the rear wheels 2.

As shown in FIG. 2, the control valve 27 is operable by an actuating device 30 by way of an oscillatable arm 29. The control device 30 is provided with a sensor 31 for detecting a steering angle of the front wheels 1 and a sensor 32 for detecting an action of one of the steering brakes (not shown) provided for the rear wheels 2, respectively. The actuating device 30 is operable in response to signals from the sensors 31 and 32 such that the control valve 27 is automatically switched to a speed increasing side only when the steering angle of the front wheels 1 exceeds a predetermined value and one of the brakes is in action.

Thus, the described construction is switchable between a drive position in which the front wheels 1 and the rear wheels 2 are driven at a substantially equal average circumferential speed, the average speed being of the right wheel speed and the left wheel speed, and a drive position in which the front wheels 1 are driven at a greater average circumferential speed than the rear wheels 2 for making a small sharp turn. The latter drive position making a small sharp turn is automatically obtained only by turning the front wheels 1 and by operating a steering clutch to apply the brakes to the rear wheels 2.

Figure 7:
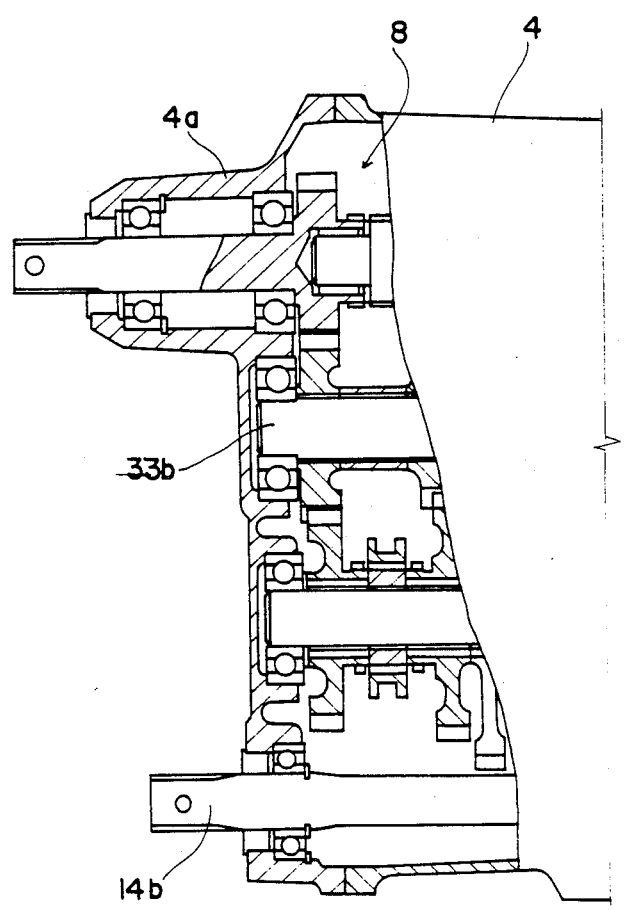
FIG. 7 is a partly broken away side view of a main transmission part.

For connecting the speed increasing transmission part 12 to the main transmission part 8, the hydraulic pump 28 must be mounted in the transmission case 4 to be driven by an intermediate shaft 33a of the main transmission part 8 and the control valve 27 must also be mounted in the transmission case 4. Referring to FIGS. 3 and 7, for this purpose an intermediate shaft 33b and a front wheel drive output shaft 14b of the main transmission part 8, which is without the speed increasing transmission part 12, are convertible to the intermediate shaft 33a to which the hydraulic pump 28 is connected and the output shaft 14a to which the input shaft 13 of the speed increasing transmission part 8 is connected, respectively. At the same time, a front wall 4a of the transmission case 4 is replaced by a threesome case portion consisting of a first case part 4c for supporting the shafts of the main transmission part 8, a second case part 4d for the input shaft 11 and the speed increasing transmission part 12, and a third case part 4e for the speed increasing transmission part 12.

The main transmission part will particularly be described hereinafter with reference to FIGS. 3 through 5.

(I) Main Change Speed Mechanism 34:

The input shaft 11 projects forwardly from an upper front portion of the transmission case 4 to be coupled to the rotary shaft 10 leading from the main clutch (FIG. 1). A first intermediate shaft which the already mentioned intermediate shaft 33a is disposed below and operatively connected to the input shaft 11 through gears G1 and G2. A second intermediate shaft 36 disposed below the first intermediate shaft 33a carries freely rotatably mounted thereon gears G5, G6 and G7 in mesh with the gears G2, G3, and a gear G4 fixed to the first intermediate shaft 33a. The second intermediate shaft further carries a first shift sleeve S1 adapted to bring the gear G7 into and out of engagement with the second intermediate shaft 36 through a spline collar C1, and a second shift sleeve S2 adapted to bring the gear G5 or the gear G6, respectively, into and out of engagement with the second intermediate shaft 36 through a spline collar C2. A first speed is obtained by shifting the first shift sleeve S1 leftward in FIG. 3 to connect the gear G7 to the second intermediate shaft 36, a second speed is obtained by shifting the second shift sleeve S2 rightward to connect the gear G6 to the second intermediate shaft 36, and a third speed is obtained by shifting the second shift sleeve S2 leftward to connect the gear 5 to the second intermediate shaft 36.

(II) Backward and Forward Reversing Mechanism 37:

A third intermediate shaft 38 is disposed coaxial with and rearwardly of the second intermediate shaft 36. The third intermediate shaft 38 carries a third shift sleeve S3 at a forward end thereof. A forward drive position is obtained by shifting the third shift sleeve S3 leftward to establish a direct spline connection between a spline collar C3 of the second intermediate shaft 36 and a spline collar C4 of the third intermediate shaft 38. A backward drive position is obtained by shifting the third shift sleeve S3 rightward to connect the third intermediate shaft 38 to a gear G8 freely rotatably mounted thereon. More particularly, as shown in FIG. 4, a gear G9 fixed to a rear end of the second intermediate shaft 36 is in constant mesh with a back gear G10 mounted for free rotation on a back shaft 39, the back gear G10 in turn is in constant mesh with a gear G11 mounted at a forward end of a sleeve shaft 40 surrounding the output shaft 14a disposed in a lower portion of the transmission case 4, and a gear G12 mounted at a rear end of the sleeve shaft 40 is in constant mesh with the gear G8 freely rotatably mounted on the third intermediate shaft 38. Thus, the third intermediate shaft 38 is put into reverse rotation by power transmitted through the sleeve shaft 40.

(III) Auxiliary Change Speed Mechanism 41:

The third intermediate shaft 38 carries a pair of large gear G13 and small gear G14 fixed thereto, which are in mesh with gears G15 and G16 freely rotatably mounted on a final shaft 42 above the third intermediate shaft 38. The final shaft 42 further carries a fourth shift sleeve S4 adapted to bring the gear G15 and G16 selectively into and out of operative engagement with the final shaft 42 through a spline collar C5. A low speed drive state is obtained when the shift sleeve S4 is shifted leftward in the drawings, and a high speed drive state is obtained when the shift sleeve S4 is shifted rightward.

(IV) Super-Reduction Mechanism 43:

As shown in FIG. 5, the transmission case 4 defines an opening 44 in a left side portion thereof where a supporting bracket 45 is provided, the supporting bracket 45 being attachable and detachable from outside the case 4. The bracket 45 carries a shaft 54 which in turn carries a large gear G17 and a small gear G18 integral with each other and shiftable along the shaft 54. The large gear G16 of the auxiliary change speed mechanism 41 is rigidly connected with a small wide gear G19 in constant mesh with the large gear G17. A gear G20 engagable with the small gear G18 is splined to the final shaft 42. The final shaft 42 is adapted to be driven at a greatly reduced speed by shifting the large and small gears G17 and G18 leftward in the drawing to bring the small gear G18 into mesh with the gear G20 when the auxiliary change speed mechanism 41 is in neutral.

(V) Front Wheel Drive Switching Mechanism 47:

The gear 20 of the super-reduction mechanism 43 is integral with a gear 23 for transmitting power for front wheel drive, and the third intermediate shaft 38 carries a gear G24 and a gear 25 integral with each other and freely rotatable thereon, the gear 24 being in mesh with the gear G23. The front wheel drive output shaft 14a carries, splined to a rear portion thereof, a gear G26 shiftable into mesh with the freely rotatable gear G25. Thus the shaft 14a may be driven or stopped by shifting the gear G26.

(VI) Power Takeoff Change speed Mechanism 48:

A first intermediate shaft 49 of the power takeoff line is disposed rearwardly of the input shaft 11, and carries at a rear end thereof a freely rotatable gear G27 which is in constant engagement with a gear G28 fixed to the first intermediate shaft 33a. The first intermediate shaft 49 of the power takeoff line further carries a shift gear G29 splined thereto, which is shiftable between a position to engage a periphery of a boss portion of the freely rotatable gear G27 and a position to engage the gear G3 of the main change speed mechanism 34. The first intermediate shaft 49 rotates at a low speed when the shift gear G29 is shifted rightward in the drawing and rotates at a high speed when the shift gear G29 is shifted leftward. The first intermediate shaft 49 is coupled at a rear end thereof to a second intermediate shaft 51 of the power take-off line through a clutch type limiter 50. The second intermediate shaft 51 is coupled to the power takeoff shaft 7 through a reduction gearing which is not shown.

The described embodiment of this invention may be modified such that the switching operation for the speed increasing transmission part 12 is carried out manually. Furthermore, the frames 5 connecting the transmission case 4 to the engine 3 may be replaced by a tubular case.

Figure 6:
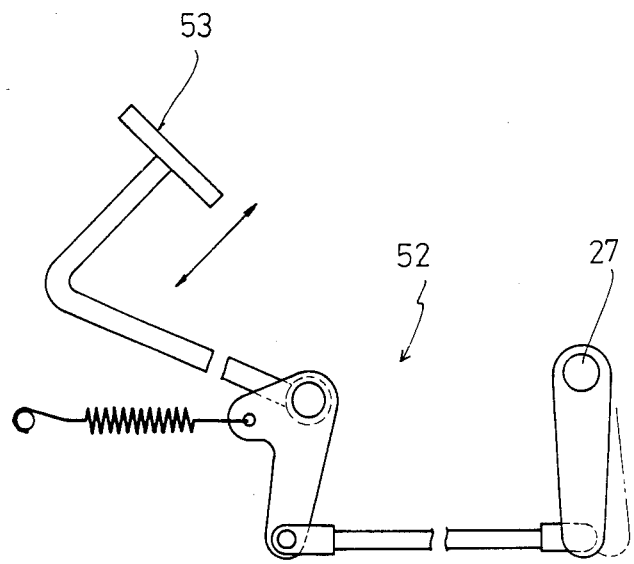
FIG. 6 is a view showing a clutch control mechanism for the front wheel speed increasing transmission part.

FIG. 6 shows an example of construction for manually controlling the speed increasing transmission part 12. In this construction, the valve 27 is connected through a link mechanism 52 to a foot pedal 53. By depressing this foot pedal 53, the uniform speed clutch 24 and the speed increasing clutch 25 are selectively brought into and out of operation.

We claim:

1. A transmission for agricultural tractors comprising a main transmission part, and a speed increasing transmission part directly connected to said main transmission part and adapted to drive a right and left pair of dirigible front wheels at a greater average circumferential speed than a right and left pair of rear wheels, said main transmission part including an output shaft for driving the front wheels, and said speed increasing transmission part including an input shaft and an output shaft, wherein said speed increasing transmission part is disposed forwardly of said main transmission part such that said input shaft and said output shaft thereof are arranged coaxial with said output shaft of said main transmission part for driving the front wheels.

2. A transmission for agricultural tractors as claimed in claim 1 wherein said speed increasing transmission part further comprises an intermediate shaft disposed above said input shaft and said output shaft and constantly driven by said input shaft through a gear interlocking, said intermediate shaft carrying a first freely rotatable drive gear in mesh with a first driven gear mounted on said output shaft, a second freely rotatable drive gear in mesh with a second driven mounted on said output shaft, and an output wheel rotatable in unison with said intermediate shaft, a uniform speed hydraulic clutch being mounted between said first freely rotatable drive gear and said output wheel, a speed increasing hydraulic clutch being mounted between said second freely rotatable drive gear and said output wheel, oil chambers for pistons associated with said two clutches, respectively, being connected to a hydraulic pump through oil passages defined in said intermediate shaft and a control valve adapted to operate said clutches selectively.

* * * * *